United States Patent

Davies et al.

[11] Patent Number: 5,862,255
[45] Date of Patent: Jan. 19, 1999

[54] BROAD BANDWIDTH IMAGE DOMAIN COMMUNICATION CHANNEL WITH SYMBOL INTERFERENCE SUPPRESSION

[75] Inventors: Daniel Davies; Dan S. Bloomberg, both of Palo Alto; Robert E. Weltman, Los Altos, all of Calif.

[73] Assignee: Xerox Corporation, Stamford, Conn.

[21] Appl. No.: 665,700

[22] Filed: Jun. 18, 1996

[51] Int. Cl.$^6$ ............................... G06K 9/18; G06K 9/46
[52] U.S. Cl. .................... 382/183; 382/203; 235/462; 235/456; 235/494
[58] Field of Search ................... 382/181, 196, 382/203, 201, 183, 257; 235/435, 439, 462, 470, 456, 494

[56] References Cited

U.S. PATENT DOCUMENTS

| | | | |
|---|---|---|---|
| 4,468,808 | 8/1984 | Mori et al. | 382/196 |
| 4,630,308 | 12/1986 | Hong | 382/198 |
| 4,685,138 | 8/1987 | Antes et al. | 382/183 |
| 5,026,975 | 6/1991 | Gubar et al. | 235/470 |
| 5,091,966 | 2/1992 | Bloomberg et al. | 382/257 |
| 5,155,344 | 10/1992 | Fardeau et al. | 235/470 |
| 5,168,147 | 12/1992 | Bloomberg | 235/456 |
| 5,449,895 | 9/1995 | Hecht et al. | 235/494 |
| 5,710,420 | 1/1998 | Martin et al. | 235/494 |

*Primary Examiner*—Bipin Shalwala

[57] ABSTRACT

The glyphs of self-clocking glyph codes are written on regular hexagonal or pseudo-hexagonal lattice-like patterns of centers to reduce the risk of interglyph interference during the read process while also enabling the glyphs to be packed more densely while maintaining a given center-to-center spacing between them.

4 Claims, 1 Drawing Sheet

BROAD BANDWIDTH IMAGE DOMAIN COMMUNICATION CHANNEL WITH SYMBOL INTERFERENCE SUPPRESSION

FIELD OF THE INVENTION

This invention relates to two dimensional (2-D) symbologies for optically recording machine readable digital information on image recording media, such as plain paper documents. More particularly, this invention pertains to graphical layouts for enhancing the visual appearance, increasing the spatial bit density and enhancing the readability of self-clocking glyph codes.

BACKGROUND OF THE INVENTION

One and two dimensional symbologies have been proposed for optically recording machine readable digital information on plain paper documents and the like. The principal purpose of these symbologies is to establish reliable digital communication channels in the image domain. While 1-D symbologies still have an important role, there has been a shift toward 2-D symbologies because they tend to more fully respond to the demand for broader band width communication channels and to the related need for increased spatial bit density recording capacities.

The Xerox Dataglyph™ symbology is an especially promising 2-D symbology for optically recording machine readable digital information on traditional and not so traditional image recording media. Its spatial bit density recording capacity and its tolerance to image distortion and image degradation compare favorably with the best of the other known 2-D symbologies. Furthermore, the Dataglyph™ symbology is esthetically far superior to these other 2-D symbologies because of its substantially homogeneous visual appearance. Indeed, when used to record at higher spatial bit densities, the Dataglyph™ symbology has a unobtrusive, generally uniform grayscale visual appearance. This esthetic advantage is an important attribute, especially for applications that involve combining machine readable and human readable information on documents which are intended to favorably impress human readers.

Dataglyphs™ are based on relatively simple "self-clocking glyphs codes." In accordance with the Dataglyph™ symbology, such a code is composed of elongated slash-like symbols or glyphs which are written on a regular lattice of centers at tilt angles of approximately +45° and −45° from vertical for the recording of binary "0's" and "1's," respectively, No information is encoded in the spaces between the glyphs or in the relative spacing of the transitions between the glyphs and the background. Instead, each bit is independently and explicitly encoded by a glyph. The glyphs, therefore, provide a reliable clock for reading the bits out of the code, even in the presence of significant image distortion and/or image degradation (i.e., the bits are recoverable if the glyphs can be located and identified with sufficient precision to enable any errors to be corrected by the error correction protection, if any, that is provided).

Higher spatial bit density Dataglyphs™ conventionally are written on regular rectangular lattice-like patterns of centers by printers operating at printer resolutions on the order of 300–600 d.p.i. (dots/inch). In practice, the individual glyphs may be as small as 3–5 pixels long, and these glyphs may be written at a nominal center-to-center spacing of only about 5–7 pixels horizontally and vertically. The high spatial density at which the glyphs are written causes the recorded code to have a generally uniform grayscale appearance because the individual glyphs tend to blend together when viewed by the unaided human eye at normal reading distance under normal lighting conditions. However, there is a problem with the inter-glyph interference which can manifest itself in these higher density glyph codes.

Inter-glyph interference occurs when the ends of diagonally adjacent glyphs come into contact or near contact (i.e., such close proximity that the gap between them cannot be resolved by the scanner that is used to read the code). Such interference hinders the reading of the code by making it more difficult to accurately locate the centers of the individual glyphs and to unambiguously determine the values encoded by them. Thus, interglyph interference is a limiting factor on the density at which the glyphs can be recorded, scanned and read. It, therefore, would be beneficial to reduce the risk of interglyph interference, especially if this can be accomplished without sacrificing bit recording density.

SUMMARY OF THE INVENTION

To that end, in accordance with the present invention, the glyphs of self-clocking glyph codes are written on regular hexagonal or pseudo-hexagonal lattice-like patterns of centers. This not only reduces the risk of interglyph interference by laterally offsetting the tips of the glyphs from each other, but also enables the glyphs to be packed more densely while maintaining the same center-to-center spacing between them. Moreover, at least some observers find the recorded glyph code to have a more uniform visual appearance because the fine line structures that are produced when diagonally aligned glyphs encode identical values are broken.

BRIEF DESCRIPTION OF THE DRAWINGS

Still further objects and advantages of this invention will be apparent when the following detailed description is read in conjunction with the attached drawings.

DETAILED DESCRIPTION OF THE INVENTION

While the invention is described in some detail hereinbelow with reference to certain illustrated embodiments, it is to be understood that there is no intent to limit it to those embodiments. On the contrary, the intent is to cover all modifications, alternatives and equivalents falling within the spirit and scope of this invention as defined by the appended claims.

Figure 1:
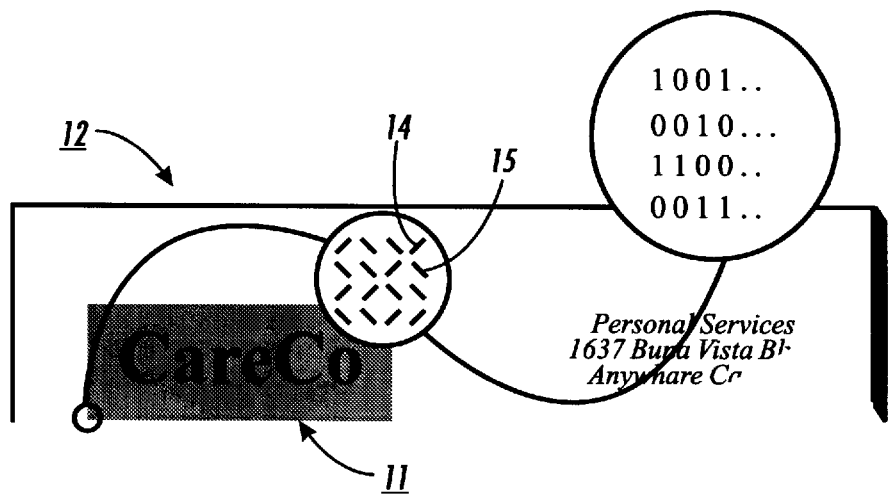
FIG. 1 schematically illustrates, a different magnifications, a standard layout of a self-clocking glyph code on a document and the intended interpretation of the code.

Turning now to the drawings, and at this point especially to FIG. 1, there is to a self-clocking glyph code 11 which is written on, for example, an ordinary plain paper document 12. In keeping with standard practices, the glyph code 11 is composed of elongated slash-like symbols or glyphs, as at 14 and 15, which are written on a regular rectangular lattice of centers. As illustrated, the glyphs 14 and 15 are designed to tilt at about +45° and −45° with respect to vertical to is encode binary "0's" and "1's," respectively. Therefore, the tips of diagonally neighboring glyphs that encode like bit values may be in close proximity to one another, if not in a actual contact, especially when the glyph code 11 has a high spatial bit density. This, in turn, can result in unwanted interglyph interference.

Figure 2:
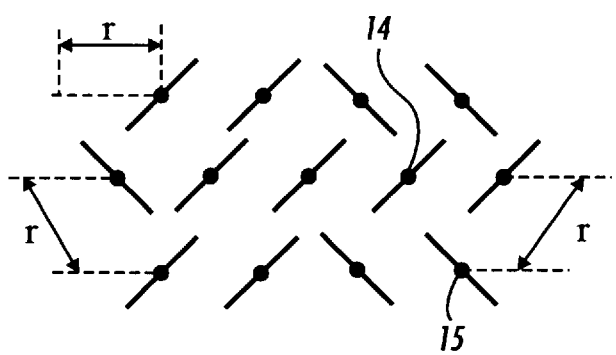
FIG. 2 is an enlarged fragmentary view of a glyph code having a hexagonal close-packed layout in accordance with one embodiment of this invention.

To alleviate the potential interglyph interference problem, without reducing the spatial bit density recording capacity of such a self-clocking glyph code, the glyph code 11 is written in accordance with this invention on a hexagonal lattice of centers. As shown in FIG. 2, this lattice may be hexagonally precise, such that each glyph within the interior of the code pattern is nominally located at the center of a perfect hexagon of neighboring glyphs. This is referred to herein as a "hexagonally close-packed lattice" because it provides the greatest glyph density for a given center-to-center spacing, r, of the glyphs.

Figure 3:
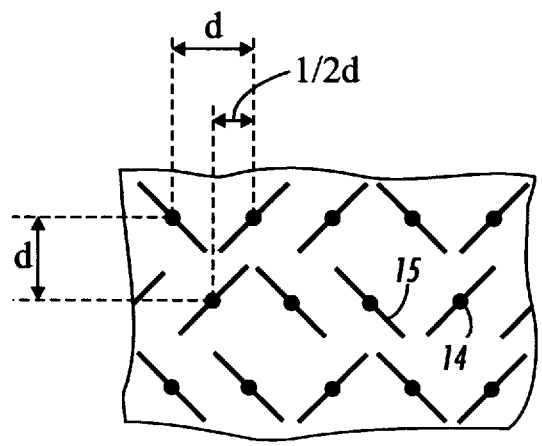
FIG. 3 is an enlarged fragmentary view of a glyph code having a pseudo-hexagonal layout in accordance with another embodiment of this invention.

Alternatively, as shown in FIG. 3, the lattice may be pseudo-hexagonal, which means that the centers in alternate rows of the lattice are horizontally offset with respect to the centers in the other rows by approximately one-half the nominal horizontal spacing of the centers. The nominal vertical distance between the rows of centers in this pseudo-hexagonal is equal to the nominal horizontal center-to-center spacing d, so the packing density is not as high as that of the close packed hexagonal layout for a given center-to-center spacing of the glyphs.

However, both of these hexagonal layouts reduce the risk of interglyph interference at a given glyph density because they cause glyphs in neighboring rows of the lattice to be laterally displaced from each other in a direction perpendicular to the axes of the glyphs. For example, the pseudo-hexagonal lattice provides a displacement of about 0.35 L in a direction that is perpendicular to the axes of the glyphs, where L is the nominal horizontal center-to-center spacing of the glyphs. Thus, as used herein, a "hexagonal lattice of glyph centers" refers to a 2-D layout in which each interior glyph has six neighbors: two in its row, two in the row just above, and two in the row just below.

CONCLUSION

In view of the foregoing, it will be seen that this invention reduces the risk of potentially troublesome inter-glyph interference in self-clocking glyph codes that are written at a given glyph density. Furthermore, it will be understood that this reduced risk of inter-glyph interference is especially significant for glyph codes having higher spatial bit densities. Moreover, it will be evident that this invention tends to enhance the visual appearance of high spatial bit density glyph codes because it prevents glyphs in neighboring rows of the lattice from axially aligning and, therefore, effectively suppresses extended fine line artifacts.

What is claimed is:

1. An image domain digital communication channel for machine readable digital information, said communication channel comprising a recording medium, and machine readable glyphs written on said recording medium on a pseudo hexagonal lattice-like pattern of centers, in which ones of the centers of said lattice-like pattern form a row of centers that are horizontally offset from each other within the row by a nominal horizontal spacing and from other centers in adjacent rows by approximately one-half of the nominal horizontal spacing, said glyphs being configured in accordance with said digital information, thereby providing a machine readable representation of said digital information.

2. The communication channel of claim 1 wherein said glyphs are elongated slash-like symbols which are tilted one way and the other with respect to a vertical axis to encode binary "0's" and "1's," respectively.

3. The communication channel of claim 2 wherein said glyphs are tilted at about +45° and −45° with respect to said vertical axis to encode said binary "0's" and "1's," respectively.

4. The communication channel of claim 3 wherein said glyphs are about 3–5 pixels long, said centers are displaced from each other by about 5–7 pixels, and said glyphs are written on said centers at a printer resolution of about 300–600 d.p.i., whereby said representation of said digital information has a generally uniform grayscale appearance.

\* \* \* \* \*